J. C. COLE.
DEMOUNTABLE RIM.
APPLICATION FILED MAY 10, 1912.
1,114,965.
Patented Oct. 27, 1914.
2 SHEETS—SHEET 1.
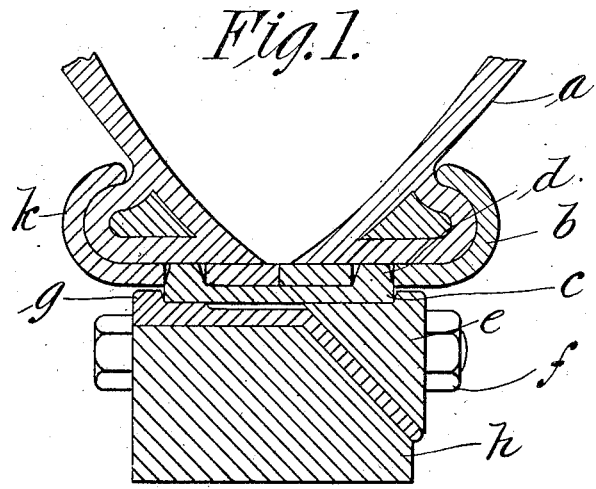
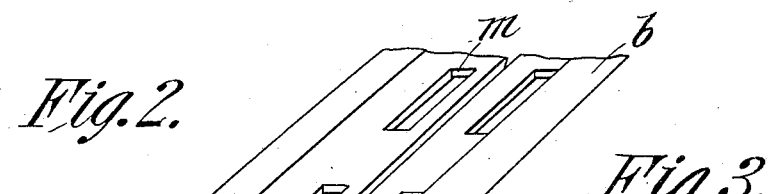
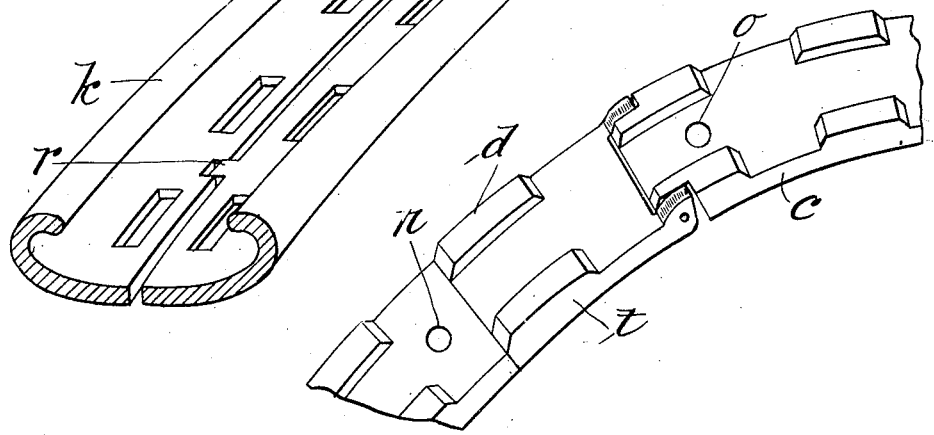
WITNESSES:
H. L. Sprague
R. M. Mowry
INVENTOR,
John C. Cole,
BY
Chapin & Co
ATTORNEYS

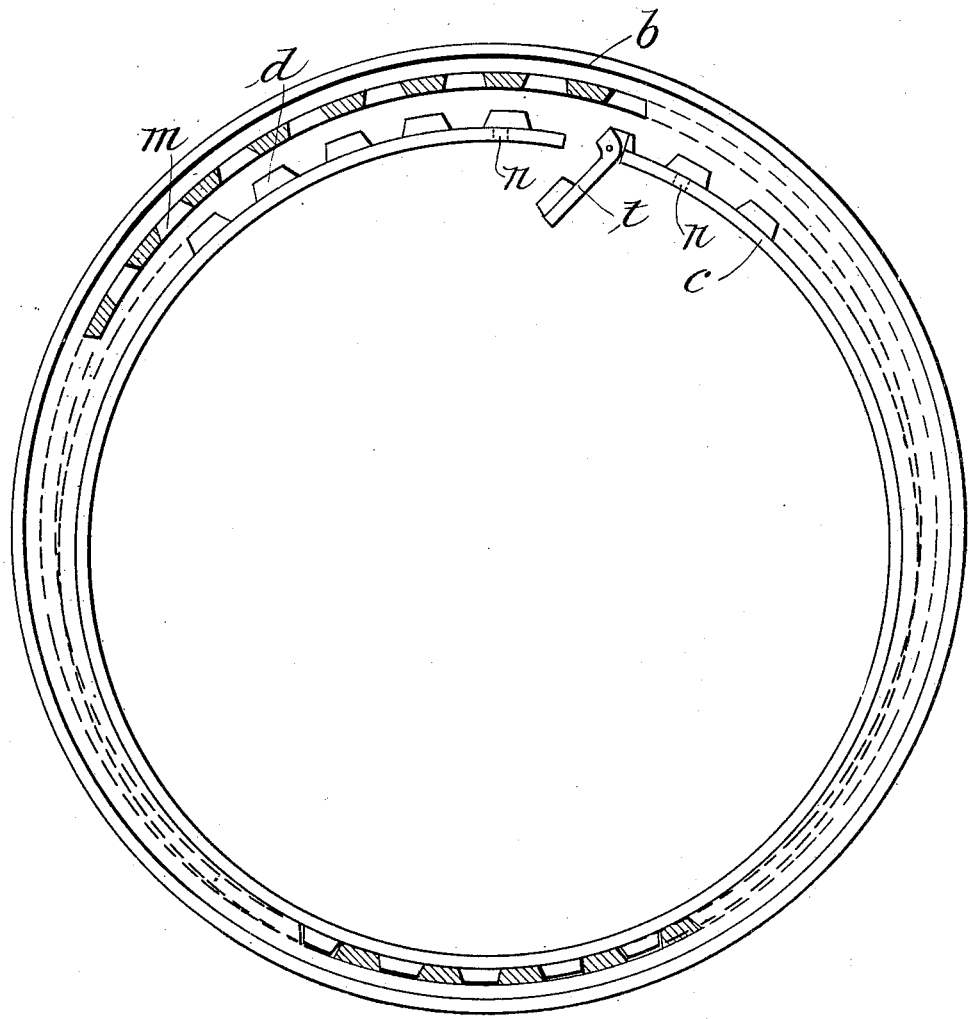

UNITED STATES PATENT OFFICE.

JOHN CLARENCE COLE, OF CHICOPEE FALLS, MASSACHUSETTS, ASSIGNOR TO FISK RUBBER COMPANY, OF CHICOPEE FALLS, MASSACHUSETTS, A CORPORATION OF DELAWARE.

DEMOUNTABLE RIM.

1,114,965.  Specification of Letters Patent.  Patented Oct. 27, 1914.

Application filed May 10, 1912. Serial No. 696,311.

*To all whom it may concern:*

Be it known that I, JOHN CLARENCE COLE, a citizen of the United States, residing at Chicopee Falls, in the county of Hampden and State of Massachusetts, have invented new and useful Improvements in Demountable Rims, of which the following is a specification.

This invention relates to automobile wheels and particularly to the rim construction thereof whereby a pneumatic tire can be easily manipulated in the operations of repairing or replacing tires.

The invention embodies a demountable rim made in two circumferential parts which rim is suitably fastened to the tire to go on or off the felly with the tire. The rim is divided into its two parts circumferentially whereby the two parts can be separated as the inner tube is pulled out of or placed in the shoe. A locking ring with means for engaging and holding the demountable rim thereto is provided together with fastening devices to bind the removable rim to the felly as desired.

The object of the invention is to provide an improved construction of the class referred to.

Other objects will appear in the detailed description and annexed claims.

In the drawings Figure 1 is a cross section through the demountable rim, locking ring, fixed rim, and felly showing the parts assembled with the tire in place. Fig. 2 is a perspective view of a portion of the demountable rim. Fig. 3 is a perspective view of the locking ring showing the latch thereof in closed position. Fig. 4 is a side elevation partly in cross section of the locking ring and demountable rim showing the position taken by the locking ring when the latch thereof is inoperative.

Referring to Fig. 1 the felly $h$ usually has a fixed rim $g$ permanently attached thereto by any suitable means. This rim can be of metal such as steel and serves as a true supporting surface for the locking ring. The felly itself could serve as the true supporting surface but it is preferable to provide said fixed rim as described. The locking ring $c$ is made self-contracting so that when the latch is not in closed position the diameter of the fixed rim is less than the demountable rim. A latch is provided in the locking ring (see Figs. 3 and 4) so that said ring when forced outwardly to increase its diameter can be kept in its expanded position by closing the latch. The normal position of the locking ring with the latch out of place is indicated in Fig. 4, while the closed position of the latch and the ring expanded is indicated in Fig. 3. This ring is provided with a series of projections $d$ all for a purpose to be described. The demountable rim is made in two circumferential sections $b$ and $k$ each provided with slots $m$ arranged in circumferential series to coöperate with projections $d$ of the locking ring. One or more dowel pins $r$ are provided to properly position the two halves $b$ and $k$ to receive the projections $d$ of the locking ring. In the locking ring $c$ adjacent to the latch $t$ there are two holes $n$ and $o$ for the purpose of expanding said locking ring into latch closing position by the use of any suitable tool. The projections on the locking ring $c$ are wedge shaped at their ends in order that they may easily enter or leave the slots $m$ in the demountable rim $k$ and $b$.

The operation of the structure is as follows: The tire $a$ is first placed on the demountable rim $k$ and $b$, the beading of the tire being engaged by the hooked shaped sides of said rim and the division line between the two halves of the rim being in line with the opening of the tire shoe. The demountable rim is then adjusted so that the slots will be in proper relation as in line with one another as shown in Fig. 2, and kept in this position by means of the dowel pin $r$. The locking ring $c$ is then placed inside of the demountable rim with the projections at the side opposite the latch engaging the slots $m$ of the demountable rim in a manner indicated in Fig. 4. It is now necessary to close the latch $t$. This is done by inserting a suitable tool in holes $n$ and $o$ whereby the locking ring is spread and expanded in a manner to force the projections $d$ on the latch side of the ring into the slots $m$ of the demountable rim. The latch $t$ is then brought upwardly and the projections $d$ thereon are forced into the corresponding slots $m$ in the demountable rim. The tire $a$, members $b$ and $k$, and the locking ring $c$, are now held firmly together and remain in this condition as long as the projections *d* on the latch *t* engage the slots *m* in members *b* and *k*. Thus the assembled device may be slid as a unit onto the wheel and the expanding ring *e* and binding device *f* may be thereafter applied to secure the unit to the felly *h*.

It is to be noted particularly that the entire device, comprising the tire *a*, members *b* and *k*, and the ring *c*, may be removed as an assembled unit from the wheel while the tire *a* is inflated without causing the collapse of the ring *c*. The pressure of the air within the tire *a* tends to separate the members *b* and *k* and thereby forces one side wall of each slot *m* against one side of each projection *d*. Also the contractile tendency of the ring *c*, causes one end of each projection *d* to be forced against one end wall of each slot *m*. However, even though the projections *d* are slightly wedge shaped it is impossible for the members *b* and *k* to ride upwardly upon the projections *d* by the action of the forces just described. This is true since the square end of the latch *t* engages the square end of the ring *c* and thereby prevents collapse of the latter and maintains the diameter thereof constant. Thus, until the latch *t* is forcibly removed, it is impossible for the ring *c* to collapse.

Where it is desired to repair or renew an inner tube the following operations enable the operator to make the repair conveniently and in a short time: The binding device *f* is operated to release the locking ring as is customary in rim constructions. The locking ring and demountable rim are slid axially off the fixed rim, the latch *t* is opened by any suitable tool, the locking ring being self-contracting as indicated in Fig. 4 enables the operator to completely withdraw said ring from any connection with the demountable rim in a manner obvious from an inspection of Fig. 4. The tire is now held by the demountable rim alone which is made in two parts, the outer shoe of the tire can be pulled apart in the customary manner and the beads will carry the two halves of the demountable rim into position to allow the inner tube to be withdrawn. The inner tube can be repaired and replaced in the shoe or a new one placed therein. The two halves of the demountable rim are brought together into proper co-acting relation and positioned by means of the dowel pin *r*. The operations first described in assembling the different parts of the rim on the felly now take place and the structure is assembled as indicated in Fig. 1.

By means of the construction and operations described it is possible to quickly remove a tire from a wheel, change an inner tube and replace the tire on the wheel without the loss of time occasioned by prying the beading of the tire from the demountable rim. It will be noted in the construction involved in this invention no necessity for removing the tire from the demountable rim ordinarily arises.

One of the essential features of the invention described lies in the manner in which the demountable rim and locking ring are operated one with the other to enable a quick removal of the inner tube from the shoe without prying the beading of the tire away from the sides of the demountable rim, an operation which is always a most tedious one in handling tires.

While applicant has described a particular form of his invention it can be varied within certain limits as defined in the annexed claims.

What I claim, is:—

1. A demountable tire-carrying rim composed of two annular members brought together in a plane perpendicular to the axis of the rim, each member being provided with a circumferential series of slots together with a self-contracting locking ring provided with projections to enter the slots of both of said members, a latch in said ring which, when open, permits the ring to contract and, when closed, prevents such contraction whereby the projections can be held in position in the slots or removed therefrom as desired.

2. A demountable tire-carrying rim, composed of two annular members brought together in a plane perpendicular to the axis of the rim, each member being provided with a circumferential series of slots, together with a self-contracting locking ring provided with circumferentially disposed projections thereon adapted when said ring is expanded to enter said slots and bind said annular members together, and a latch on said locking ring to hold said ring in expanded position whereby the annular members and locking ring are held in assembled condition and may be placed on or removed from the wheel as a unit.

JOHN CLARENCE COLE.

Witnesses:
K. I. CLEMONS,
FRANKLIN G. NEAL.